No. 671,355. Patented Apr. 2, 1901.
S. STANBRIDGE.
SCUTCHING MACHINE.
(Application filed July 5, 1900.)

(No Model.) 3 Sheets—Sheet 1.

No. 671,355. Patented Apr. 2, 1901.
S. STANBRIDGE.
SCUTCHING MACHINE.
(Application filed July 5, 1900.)

(No Model.) 3 Sheets—Sheet 2.

Witnesses
Inventor
Samuel Stanbridge
By James L. Norris
atty

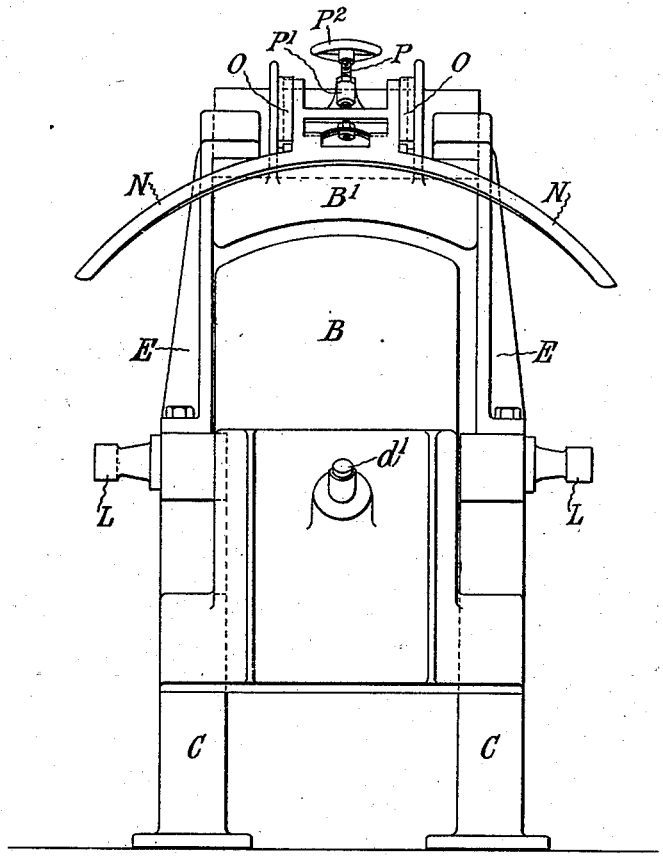

UNITED STATES PATENT OFFICE.

SAMUEL STANBRIDGE, OF LONDON, ENGLAND.

SCUTCHING-MACHINE.

SPECIFICATION forming part of Letters Patent No. 671,355, dated April 2, 1901.

Application filed July 5, 1900. Serial No. 22,648. (No model.)

*To all whom it may concern:*

Be it known that I, SAMUEL STANBRIDGE, engineer, a subject of the Queen of Great Britain, residing at London, England, (whose post-office address is 118 Seaford road, South Tottenham, in the county of Middlesex,) have invented certain new and useful Improvements in Scutching-Machines, of which the following is a specification.
This invention relates to apparatus for extracting or obtaining vegetable fibers from leaves or plants, and more especially to apparatus in which a rotary beater-wheel is employed to beat the leaves or plants, so as to remove the extraneous matter therefrom and prepare the fibers for industrial use. In apparatus of this kind as heretofore made the leaves or plants are beaten by the beater-wheel against a scutching-board, while the same are held at one end by suitable gripping devices and traversed across the face of said board. When the treatment of one end of the leaves or plants is complete, the latter are reversed, and the same operation is then performed on the other end of the leaves or plants.

Figure 1:
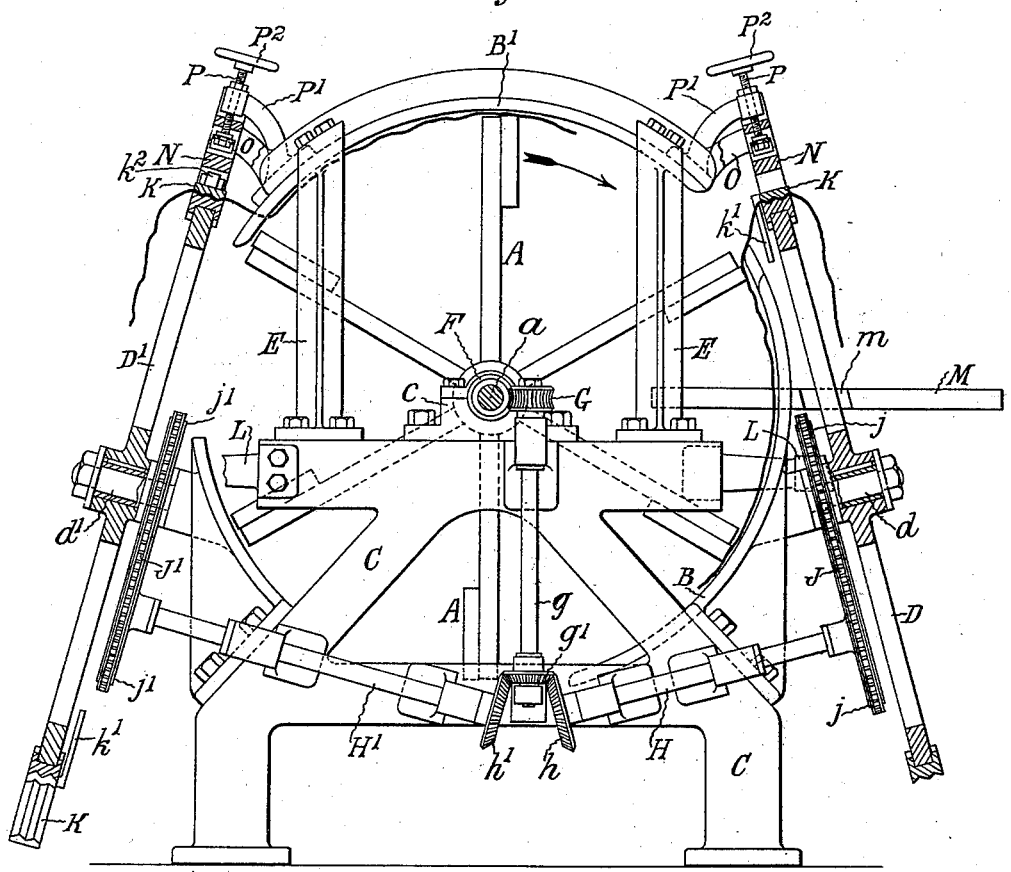
Figure 2:
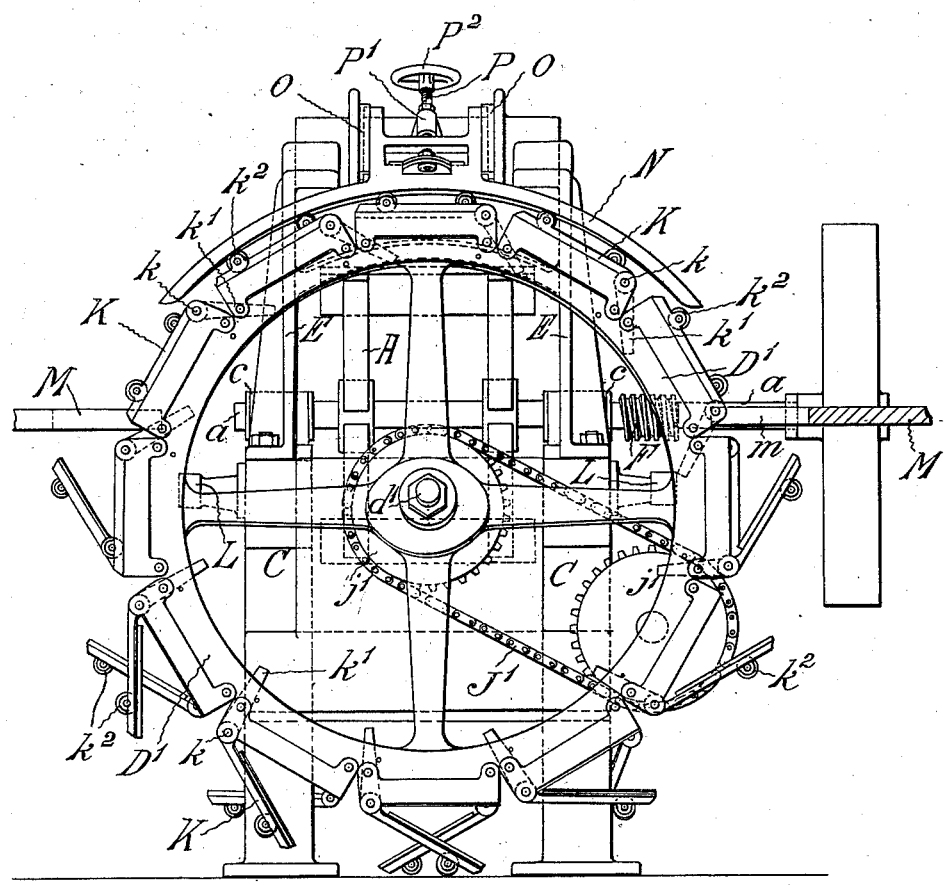

The object of my present invention is to increase the capacity of such a machine or apparatus, and this I do by providing an additional scutching-board and mechanism for feeding the leaves or plants across the board, the same being suitably constructed and arranged in reference to the beater-wheel and the other scutching-board that leaves and plants can be treated on both scutching-boards at the same time and fed thereto independently. In my improved machine, therefore, there are two scutching-boards in combination with a single beater-wheel so arranged that two sets of leaves or plants can be simultaneously treated by one beater-wheel, whereby a great saving of time is effected and the output of the machine is largely increased.
Referring to the accompanying drawings, which illustrate my invention, Figure 1 is a front elevation of the machine. Fig. 2 is a side elevation thereof looking from the left of Fig. 1; and Fig. 3 is a similar view, but with the feed-wheels removed.

Like letters of reference denote corresponding parts in the several figures.

A is the beater-wheel, and B B' are scutching-boards. The beater-wheel rotates in bearings $c$, carried by a strong frame C, to which the scutching-board B is directly attached. The upper scutching-board B' is carried by standards E E, fixed on the frame.

The feed apparatus in the example shown consists of wheels D D', rotatable on spindles $d$ $d'$, respectively, and driven in any suitable manner from the shaft $a$ of the beater-wheel. In the drawings I have shown the driving effected by a worm F on the shaft $a$ gearing with a worm-wheel G, fixed on a vertical shaft $g$, which through bevel-wheels $g'$ $h$ $h'$ drives the shafts H H', which are respectively connected by chain-wheels $j$ $j'$ and chains J J' with the spindles of the feed-wheels. This mechanism rotates the feed-wheels in opposite directions, which is advantageous, seeing that in such case the attendant without moving his position can transfer the partially-decorticated leaves or plants delivered by the first feed-wheel to the second feed-wheel to be acted upon at the other end by the beater-wheel. The wheels, however, may be rotated in the same direction. Each feed-wheel is furnished with suitable grippers or carriers for seizing and retaining the leaves or plants while they are acted upon by the beater-wheel. In the example shown these grippers consist of fingers K, hinged at $k$ on the periphery of the feed-wheel. Each gripper or carrier is formed with a tailpiece $k'$, which in the rotation of the feed-wheel is brought into contact with a stationary tripping arm or bracket L, that operates to close the said gripper just as the latter is passing through an opening $m$ in the table or support M, upon which the leaves or plants are laid by hand. In this way the gripper is caused to seize the leaves or plants and carry them around with the feed-wheel into the path of the rapidly-revolving beater-blades, which thoroughly beat the leaves against the scutching-board and remove the extraneous matter from the fibers. After the tailpieces $k'$ leave the tripping-arm L the grippers are kept closed by a segmental guide or presser N, under which the grippers pass and which presses on rollers $k^2$, carried by the backs of the grippers. The said guide or presser N is adjustable in guides O O by a screw P, working in a fixed bracket P' and arranged to be turned by a hand-wheel P² for the purpose of regulating the pressure on the leaves held by the grippers. When the grippers pass from under the guide or presser N, they are free to open, and the attendant can then remove the leaves and transfer them to the second feed-wheel to be operated on at the other end. The construction of each feed-wheel is the same.

The arrangement of the feed-wheels substantially at the opposite ends of a diameter of the beater-wheel, together with the arrangement of the scutching-boards, as shown—viz., one extending downward from its feed-wheel, while the other extends upward over the top of the beater-wheel—constitutes an important feature of my invention.

I claim—

In a scutching-machine, a rotary beater-wheel mounted upon a drive-shaft, a fixed scutching-board arranged opposite a horizontal diameter of said wheel, a fixed scutching-board arranged at the top of said wheel, a pair of inclined feed-wheels arranged on opposite sides of the beater-wheel, means connected to said drive-shaft and said feed-wheels for operating the latter, a series of grippers hinged to the periphery of each of said feed-wheels, a tripping mechanism for closing said carriers, and an adjustable presser adapted to engage said carriers, substantially as described.

In witness whereof I have hereunto set my hand in presence of two witnesses.

S. STANBRIDGE.

Witnesses:
GEO. HARRISON,
HENRY W. LYNDEN.